US011782152B1

(12) United States Patent
Devlin et al.

(10) Patent No.: US 11,782,152 B1
(45) Date of Patent: Oct. 10, 2023

(54) RADAR IMAGE INTERFACE SYSTEM

(71) Applicants: Verner Keith Devlin, Melbourne, FL (US); David A. Hobbs, Denver, CO (US); Douglas M. Dyer, Melbourne, FL (US)

(72) Inventors: Verner Keith Devlin, Melbourne, FL (US); David A. Hobbs, Denver, CO (US); Douglas M. Dyer, Melbourne, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 185 days.

(21) Appl. No.: 17/461,507

(22) Filed: Aug. 30, 2021

(51) Int. Cl.
  *G01S 13/90* (2006.01)
  *G01S 7/41* (2006.01)

(52) U.S. Cl.
  CPC .......... *G01S 13/9027* (2019.05); *G01S 7/411* (2013.01)

(58) Field of Classification Search
  CPC .................... G01S 13/9027; G01S 7/411
  See application file for complete search history.

(56) References Cited

U.S. PATENT DOCUMENTS

| | | | |
|---|---|---|---|
| 4,277,787 A | 7/1981 | King | |
| 5,008,678 A | 4/1991 | Herman | |
| 5,613,039 A | 3/1997 | Wang et al. | |
| 7,471,995 B1 * | 12/2008 | Robinson | G08G 5/0021 340/901 |
| 7,493,144 B2 | 2/2009 | Natarajan et al. | |
| 7,907,100 B2 | 3/2011 | Mortazawi et al. | |
| 8,289,203 B2 | 10/2012 | Culkin et al. | |
| 9,389,311 B1 * | 7/2016 | Moya | G06V 20/13 |
| 2007/0008211 A1 | 1/2007 | Yamano et al. | |
| 2008/0306683 A1 * | 12/2008 | Ando | G09B 29/10 345/173 |
| 2014/0062763 A1 | 3/2014 | Kishigami et al. | |
| 2014/0172266 A1 | 6/2014 | Labuhn et al. | |
| 2015/0323659 A1 | 11/2015 | Mitchell | |
| 2016/0365631 A1 | 12/2016 | Huang et al. | |
| 2017/0160389 A1 | 6/2017 | Vacanti | |
| 2017/0363738 A1 | 12/2017 | Kaino | |
| 2018/0031695 A1 | 2/2018 | Carswell et al. | |

* cited by examiner

*Primary Examiner* — Peter M Bythrow
*Assistant Examiner* — Nazra Nur Waheed
(74) *Attorney, Agent, or Firm* — TAROLLI, SUNDHEIM, COVELL & TUMMINO LLP

(57) ABSTRACT

One example includes a radar image interface system. The system includes an image processor configured to receive synthetic aperture radar (SAR) image data associated with a region of interest and to generate a radar image of the region of interest based on the SAR image data. The image processor can be further configured to divide the radar image into a plurality of sequential units corresponding to respective zones of the region of interest. The system also includes a display system configured to display zoomed sequential units corresponding to respective zoomed versions of the sequential units of the radar image to a user. The system further includes an input interface configured to facilitate sequentially indexing through each of the zoomed versions of the sequential units on the display system in response to an indexing input provided by the user.

25 Claims, 7 Drawing Sheets

RADAR IMAGE INTERFACE SYSTEM

TECHNICAL FIELD

This disclosure relates generally to sensor systems, and more specifically to a radar image interface system.

BACKGROUND

Modern aviation typically requires a greater degree of situational awareness, particularly in applications that require a greater degree of interaction with the ground surface (e.g., military applications). As one example, synthetic-aperture radar (SAR) is utilized in various air vehicles (AV) to create two-dimensional imagery of a region of interest using radar emissions. SAR imagery is typically displayed to a pilot or mission operator as a flat two-dimensional image to facilitate awareness of the active or passive features of the region of interest (e.g., to determine targets and/or threats). However, pilots typically have limited physical controls and screen space within a cockpit environment, and the mental effort and attention-span required to evaluate SAR imagery can be extremely high. As an example, the physical actions required to zoom, pan, and search a large SAR image can be challenging and time-consuming, which can conflict with the time and attention required for a pilot to operate the air vehicle and complete mission objectives.

SUMMARY

One example includes a radar image interface system. The system includes an image processor configured to receive synthetic aperture radar (SAR) image data associated with a region of interest and to generate a radar image of the region of interest based on the SAR image data. The image processor can be further configured to divide the radar image into a plurality of sequential units corresponding to respective zones of the region of interest. The system also includes a display system configured to display zoomed sequential units corresponding to respective zoomed versions of the sequential units of the radar image to a user. The system further includes an input interface configured to facilitate sequentially indexing through each of the zoomed versions of the sequential units on the display system in response to an indexing input provided by the user.

Another example includes a method for providing an interface for user interaction with a radar image. The method includes receiving synthetic aperture radar (SAR) image data associated with a region of interest and generating a radar image of the region of interest based on the SAR image data. The method also includes dividing the radar image into a plurality of sequential units corresponding to respective zones of the region of interest and displaying one of a plurality of zoomed sequential units corresponding to respective zoomed versions of the sequential units of the radar image to a user. The method further includes receiving a first single actuation indexing input to increment the sequential indexing to a next one of the zoomed versions of the sequential units and receiving a second single actuation indexing input to decrement the sequential indexing to a preceding one of the zoomed versions of the sequential units.

Another example includes aircraft comprising a radar image interface system. The system includes an image processor configured to receive synthetic aperture radar (SAR) image data associated with a region of interest and to generate a radar image of the region of interest based on the SAR image data. The image processor can be further configured to divide the radar image into a plurality of sequential units corresponding to respective zones of the region of interest. The system also includes a display system configured to display zoomed sequential units corresponding to respective zoomed versions of the sequential units of the radar image to a user. The system further includes an input interface configured to facilitate sequentially indexing through each of the zoomed versions of the sequential units on the display system in response to an indexing input provided by the user.

DETAILED DESCRIPTION

Figure 1:
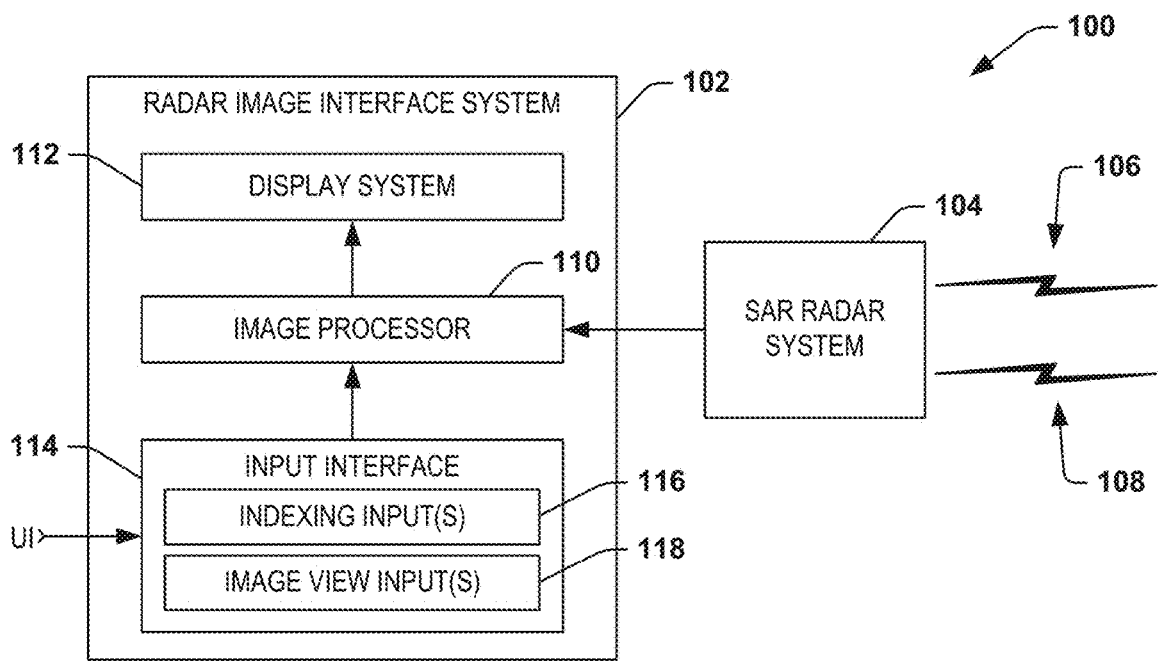
FIG. 1 illustrates an example block diagram of a radar image interface system.

This disclosure relates generally to sensor systems, and more specifically to a radar image interface system. The radar image interface system can be implemented, for example, in an aircraft to allow a pilot to rapidly examine and interpret radar image data, such as from a synthetic aperture radar (SAR) system. However, the radar image interface system can be implemented in any of a variety of other applications for rapid examination and interpretation of radar image data. The radar image interface system can include an image processor that is configured to generate a radar image from SAR image data. The radar image can be constructed in one or both of a top-down view or a perspective view. The image processor can be configured to divide the radar image into a plurality of sequential units. As described herein, the term "sequential units" with respect to the radar image corresponds to contiguous portions of the radar image that each correspond to respective zones of the region of interest and are sequentially numbered from a first portion to a last portion. The sequential units can be organized into a 2×N array, with N corresponding to a quantity of the sequential units in each of two rows or columns.

The radar image interface system can also include a display system on which the radar image is displayed. Additionally, the display system can be configured to display zoomed sequential units corresponding to respective zoomed versions of each of the sequential units of the radar image. For example, the zoomed sequential units can include overlap with adjacent sequential units, and can include visual delineation between each of the sequential units. The radar image interface system further includes an input interface that is configured to receive indexing inputs to facilitate sequential indexing of the zoomed sequential units of the radar image. As described herein, the sequential indexing corresponds to incrementing or decrementing through the zoomed sequential units of the radar image in response to an indexing input. The indexing inputs can correspond to single actuation inputs, which as described herein correspond to a single button click, a turn of a knob to a next digital orientation, a single swipe on the display system arranged as a touch-screen, or any of a variety of rapid single state-change inputs.

As a result, the user can rapidly evaluate and interpret the radar image in each of the zoomed versions of the sequential images, thereby facilitating rapid examination of the entire radar image. Specifically, by allowing the sequential indexing of the zoomed sequential units of the radar image, the user (e.g., a pilot fulfilling mission objectives) can rapidly examine the radar image by providing the indexing inputs as single actuation inputs to transition through the zoomed sequential units. Accordingly, important items of interest can be rapidly identified in the radar image without significant distraction from the task of piloting the respective vehicle (e.g., aircraft). As an example, the sequential indexing from one zoomed version of the sequential units to a next (or preceding) in a contiguous visual transition. As described herein, the term "contiguous visual transition" corresponds to a graphical transition in which the display system provides a visually uninterrupted transition between the zoomed versions of the respective sequential units as displayed on the display system. For example, the image display system can slide from one zoomed sequential unit to a next zoomed sequential unit, or can contiguously zoom out form one zoomed sequential unit and then zoom in to the next zoomed sequential unit. As a result, the user can easily identify where in the overall radar image that the zoomed sequential units belong as they are sequentially indexed.

FIG. 1 illustrates an example block diagram 100 of a radar image interface system 102. The radar image interface system 102 can be implemented in a vehicle, such as an aircraft, or in a vehicle control station. The radar image interface system 102 can be implemented to user to rapidly examine and interpret radar image data, such as from a synthetic aperture radar (SAR) system.

Figure 2:
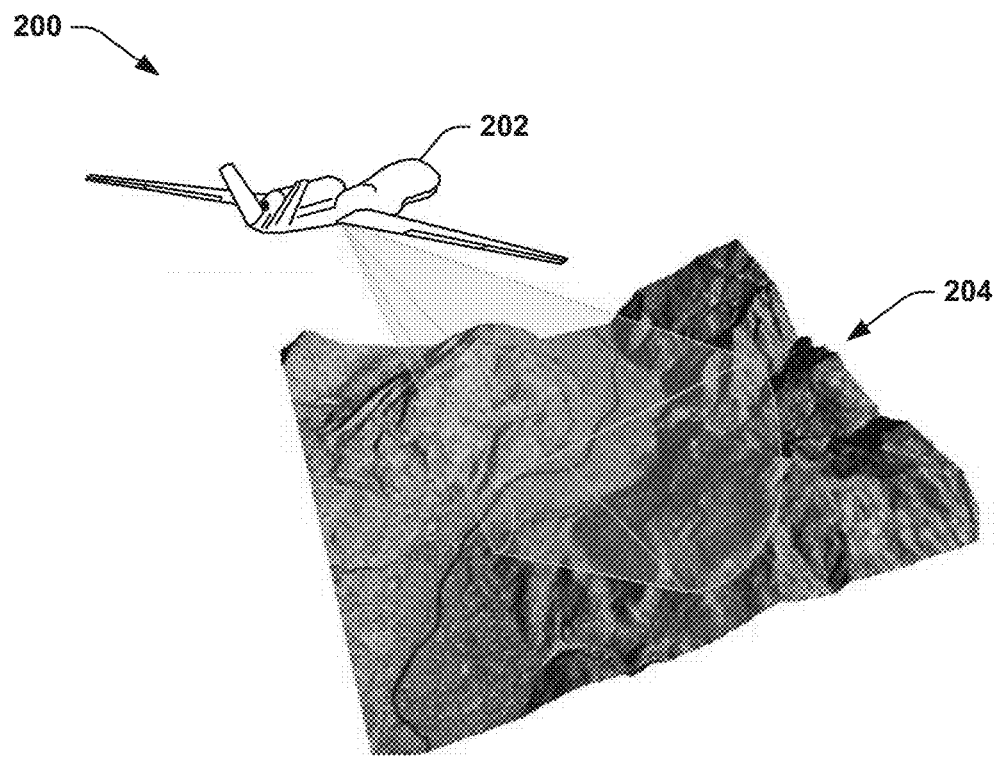
FIG. 2 illustrates an example diagram of an aircraft radar imaging system.

The radar image interface system 102 includes a SAR system 104 that is configured to transmit SAR signals, demonstrated at 106, and to receive reflected SAR signals, demonstrated at 108, to generate SAR image data, demonstrated as "SID". The generated SAR image data can correspond to a geographic region of interest for which a radar image is generated. As an example, the SAR system 104 can be mounted exterior to an aircraft that includes the radar image interface system 102, as demonstrated in the example of FIG. 2. FIG. 2 illustrates an example diagram of an aircraft radar imaging system 200 in which an aircraft 202 obtains a SAR image of a region of interest 204. The region of interest can therefore correspond to a portion of the ground that includes topological and structural features, as well as active features (e.g., vehicles). As described herein, the SAR image is obtained based on transmitting SAR signals to the region of interest and receiving reflected SAR signals corresponding to the transmitted SAR signals being reflected from the features of the region of interest. The reflected SAR signals can thus be used to generate the SAR image data SID.

Referring back to the example of FIG. 1, the radar image interface system 102 includes an image processor 110 that receives the SAR image data SID to generate a radar image of the region of interest 204. The radar image can be constructed in one or both of a top-down view or a perspective view, as described in greater detail herein. As described in greater detail herein, the image processor 110 can process and modify the radar image based on a variety of factors. The radar image interface system 102 can also include a display system 112 on which the radar image is displayed. The display system 112 can correspond to a display screen or touchscreen that displays the radar image and/or other information to the user (e.g., pilot). The image processor 110 therefore provides the processed radar image to the display system 112 to be viewable by the user.

Because the display system 112 can be implemented in a cockpit of an aircraft or confines of a vehicle, the display system 112 may be relatively small in size to be accessible to the user along with all of the controls necessary to operate the respective vehicle. As an example, a pilot may have limited physical controls and screen space within a cockpit environment. Additionally, the user may have limited time and attention to evaluate a radar image of the entire region of interest while still operating the vehicle, which can include achieving mission objectives while maintaining safety and awareness of threats. For example, the pilot of an aircraft may have limited time to evaluate the region of interest for both mission objectives and threats before having to respond to identification of both while still piloting the aircraft. Implementing controls that allow the user to zoom and pan within the radar image to search the entire region of interest may be challenging and time-consuming, and thus may conflict with the time and attention required for a pilot to safely operate the air vehicle and complete mission objectives.

To provide for a more time and attention efficient capability of evaluating the radar image on the display system 112, the image processor 110 is configured to divide the radar image into a plurality of sequential units corresponding to respective zones of the region of interest. As an example, the sequential units can be organized into a 2×N array, with N corresponding to a quantity of the sequential units in each of two rows or columns. The image processor 110 can thus provide the sequential units to the display system 112, such that the display system can display zoomed sequential units corresponding to respective zoomed versions of each of the sequential units of the radar image. The zoomed sequential units can be provided in a predetermined zoom magnification set by the image processor 110, and thus are provided in the zoomed manner without input from the user.

In the example of FIG. 1, the radar image interface system 102 further includes an input interface 114 that is configured to receive inputs from the user, demonstrated as inputs UI. The user inputs UI can include one or more indexing inputs 116 to facilitate sequential indexing of the zoomed sequential units of the radar image, as displayed on the display system 112. The sequential indexing corresponds to incrementing and/or decrementing through the zoomed sequential units of the radar image in response to an indexing input. For example, the indexing input(s) 116 can include a first indexing input to increment the zoomed sequential units, and therefore advance from one zoomed sequential unit to a next zoomed sequential unit. As another example, the indexing input(s) 116 can also include a second indexing input to decrement the zoomed sequential units, and therefore go back from one zoomed sequential unit to the immediately preceding zoomed sequential unit. As described herein, the indexing input(s) 116 correspond to single actuation inputs, and thus a single button click, a turn of a knob to a next digital orientation, a single swipe on the display system arranged as a touch-screen, or any of a variety of rapid single state-change inputs. Therefore, the image processor 110 can facilitate rapidly displaying discrete portions of the radar image in a pre-zoomed manner through which the user can sequentially index to rapidly evaluate the radar image in portions that can facilitate user knowledge of where in the radar image the zoomed sequential unit belongs.

As a result of the zoomed sequential units being displayed on the display device 112 and the sequential indexing via the indexing input(s) 116, the user can rapidly evaluate and interpret the radar image based on viewing each of the zoomed sequential units in a sequence, thereby facilitating rapid examination of the entire radar image. Therefore, the radar image can be evaluated in its entirety by providing the radar image as discrete pre-zoomed portions corresponding to the zoomed sequential units through which the user can sequentially index, as opposed to a typical radar image interfaces in which the user has to provide manual controls (e.g., zoom and pan) on the entire image to search for tokens of interest. However, by allowing the sequential indexing of the zoomed sequential units of the radar image, the user (e.g., a pilot fulfilling mission objectives) can rapidly examine the radar image by providing the indexing inputs as single actuation inputs to transition through the zoomed sequential units. Accordingly, tokens of interest can be rapidly identified in the radar image without significant distraction from the task of piloting the respective vehicle (e.g., aircraft).

The input interface 114 can also include one or more image view inputs 118. The image view input(s) 118 can be implemented via the user inputs UI to manipulate a view of a given one of the zoomed sequential units on the display system 112. For example, while indexing through the zoomed sequential units, the user can see a potential token of interest, such as a potential threat or mission objective. The user can thus provide user inputs UI to the image view input(s) 118 to zoom or pan within a given one of the zoomed sequential units, such as to verify the potential token of interest within the zoomed sequential unit. As another example, the image view input(s) 118 can include a "home" button or reset button to return to the entire radar image from a zoomed sequential unit, and/or can also include a button or touch interface to allow the user to jump to a specific one of the zoomed sequential units of the radar image. Accordingly, the image view input(s) 118 can provide for a variety of input options for the user.

Figure 3:
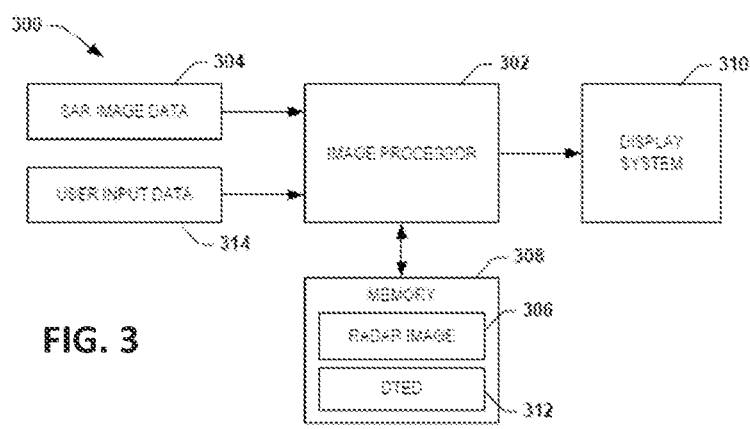
FIG. 3 illustrates another example block diagram of a radar image interface system.

FIG. 3 illustrates another example block diagram of a radar image interface system 300. The radar image interface system 300 can be arranged similar to the radar image interface system 102 in the example of FIG. 1. Therefore, reference is to be made to the example of FIG. 1 in the following description of the example of FIG. 3.

The radar image interface system 300 includes an image processor 302. The image processor 302 is demonstrated as receiving SAR image data 304, such as from the SAR system 104 in the example of FIG. 1. The SAR image data 304 can correspond to a geographic region of interest, such that the image processor 302 is configured to generate a radar image 306. In the example of FIG. 3, the radar image 306 is stored in a memory 308, such that the image processor 302 is configured to store the radar image 306 to and access the radar image 306 from the memory 308. The image processor 302 therefore provides the radar image 306 to a display system 310 for display of the radar image 306 to a user (e.g., pilot).

In the example of FIG. 3, the memory 308 is also demonstrated as storing digital terrain and elevation data (DTED) 312. As an example, the DTED 312 for the geographic region (e.g., and for regions associated with the theater of operations) can be stored in the memory 308, and/or can be received via a wireless transmission to the associated vehicle on which the radar image interface system 300 is provided. The image processor 302 is therefore configured to superimpose the radar image 306 over topographical features of the region of interest as defined by the DTED 312 to generate provide the radar image 306 as a three-dimensional image as displayed on the display system 310. Therefore, the user can evaluate the radar image 306 as a more accurate topological representation of the region of interest, and can therefore evaluate more detail regarding the environment in which potential tokens of interest are located.

As described above, the radar image 306 can be constructed in one or both of a top-down view or a perspective view, as described in greater detail herein. As an example, the image processor 302 can process and modify the radar image 306 based on a variety of factors. For example, the image processor 302 can provide a three-dimensional texture to the radar image 306 based on reflectivity data associated with the SAR image data 304. For example, the three-dimensional texture of the radar image 306 can be represented such that areas of the region of interest that provide higher reflectivity in the SAR image data 304 are represented on the radar image 306 by proportionally taller spikes on the radar image 306. Therefore, the user can quickly and easily identify portions of the region of interest that result in higher reflectivity of the SAR image data 304, which are therefore more likely to correspond to tokens of interest, based on the resulting height of the three-dimensional texture of the radar image 306. In the example of FIG. 3, the image processor 306 receives user inputs 314, such as from the input interface 114. The user inputs 314 can include a user-selected threshold for the three-dimensional texture of the radar image 306, such that only portions of the radar image 302 that have a reflectivity above the threshold are demonstrated with three-dimensionality. Thus, as an example, the remaining portions of the radar image 302 that have a reflectivity below the threshold are demonstrated as flat or non-accentuated. Therefore, the user can more rapidly identify potential tokens of interest in the radar image 302 based on the three-dimensional texture displayed as a function of reflectivity.

As another example, the display system 310 can be a color display system, and the image processor 302 can provide a colorized texture to the radar image 306 based on reflectivity data associated with the SAR image data 304. For example, the colorized texture of the radar image 306 can be represented such that areas of the region of interest that provide higher reflectivity in the SAR image data 304 are represented on the radar image 306 by proportional shifts in color (e.g., brighter colors) on the radar image 306. Therefore, the user can quickly and easily identify portions of the region of interest that result in higher reflectivity of the SAR image data 304, which are therefore more likely to correspond to tokens of interest, based on the resulting colors of the colorized texture of the radar image 306. As an example, the image processor 306 can implement both the three-dimensional texture and the color texture together in generating the radar image 306 for display on the display system.

Figure 4:
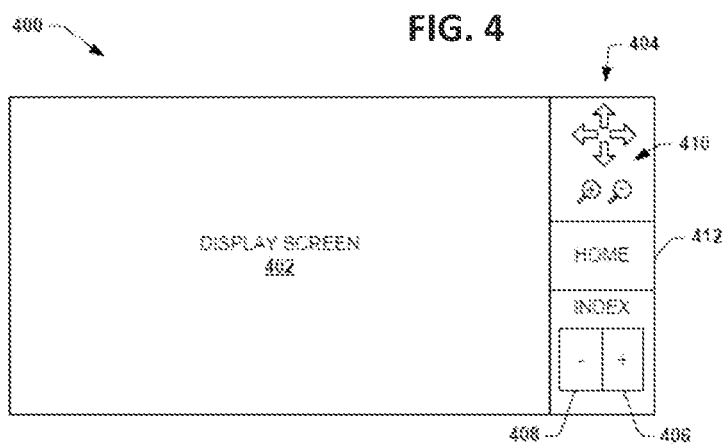
FIG. 4 illustrates an example of a display system.

FIG. 4 illustrates an example of a display system 400. The display system 400 can correspond to the display system 112 and 310 in the respective examples of FIGS. 1 and 3, and can also correspond at least in part to the input interface 114 in the example of FIG. 1. Therefore, reference is to be made to the examples of FIGS. 1-3 in the following description of the example of FIG. 4.

The display system 400 includes a display screen 402 on which the radar image (e.g., the radar image 306) can be displayed by the image processor (e.g., the image processor 302). As an example, the display screen 402 can be a passive display screen or can be a touch screen to facilitate the user inputs (e.g., the user inputs UI and 312). The display system 400 also includes an input interface portion 404 that can be arranged as physical controls or touch controls on the display screen 402 being arranged as a touch screen. The input interface portion 404 includes indexing inputs, demonstrated as a first button 406 and a second button 408. The indexing inputs can facilitate indexing through the zoomed sequential units of the radar image on the display screen 402. For example, the first button 406, demonstrated with a "+", can correspond to an increment indexing input to facilitate indexing from a given zoomed sequential unit to the next zoomed sequential unit in order. The second button 408, demonstrated with a "−" can correspond to a decrement indexing input to facilitate indexing from a given zoomed sequential unit to the immediately preceding zoomed sequential unit in order.

In the example of FIG. 4, the indexing inputs 406 and 408 are demonstrated as single actuation inputs. Therefore, based on a single press of one of the buttons 406 and 408, the display screen 402 can change from displaying one zoomed sequential unit to a next or previous zoomed sequential unit of the radar image, respectively. As a result, the indexing inputs 406 and 408 can facilitate rapid single state-change inputs to allow the user (e.g., pilot) to rapidly evaluate the radar image for potential tokens of interest.

The input interface portion 404 also includes additional controls for facilitating user interaction with the radar image, including the zoomed sequential units of the radar image. For example, the input interface portion 404 includes zoom and pan controls 410 that can allow the user to zoom and pan within a given one of the zoomed sequential units of the radar image. Therefore, in response to the user identifying a potential token of interest in a given one of the zoomed sequential units, the user can zoom in further and/or pan in the further zoomed mode to more thoroughly examine the potential token of interest and/or the surrounding terrain in the region of interest using the zoom and pan controls 410. In addition, the input interface portion 404 includes a home button 412 that can allow the user to access the entire radar image from any one of the zoomed sequential units of the radar image, without having to index through the entirety of the zoomed sequential units. For example, the indexing inputs 406 and 408 can allow for sequentially indexing through the zoomed sequential units, with the entire radar image being part of the sequence by incrementing from the last zoomed sequential unit or decrementing from the first zoomed sequential unit. However, with the home button 412, the user can jump to the entire radar image at any time, such as to start the process of sequentially indexing through the zoomed portions over again.

The controls demonstrated on the input interface 404 in the example of FIG. 4 are provided by example. Therefore, the input interface 404 is not limited to the controls demonstrated in the example of FIG. 4, but can instead include more or fewer controls. As one example, the input interface 404 can include only a single indexing input (e.g., to advance through the zoomed sequential units of the radar image). As another example, the input interface 404 can include more controls for interacting with the radar image, such as to set the thresholds for a three-dimensional texture of the radar image or to toggle display modes for the radar image (e.g., the three-dimensional or color textures). Additional controls associated with the input interface 404 can include adjusting the gain of the radar image (e.g., the radar image 306), toggling between color and grayscale display of the radar image, color inversion of the radar image, and additional controls for manipulating the radar image (e.g., rotation). The controls on the input interface 404 can thus be arranged in a manner that allows a user (e.g., a pilot) to be able to adjust the level and type of detail of the radar image so as to facilitate rapid analysis of the respective radar image. Therefore, the display system 400 can be arranged in any of a variety of ways.

Figure 5:
FIG. 5 illustrates an example of a radar image.

FIG. 5 illustrates an example of a radar image 500. The radar image 500 can correspond to an image of the region of interest that has been processed by the image processor 302 and normalized to fit a geometric shape (e.g., rectangular) to be displayed on the display screen 402. In the example of FIG. 5, the radar image 500 is demonstrated in an overhead view, such that the image processor 302 can adjust the SAR image data to construct the radar image to appear as an overhead view to the user, despite the SAR image data being collected, for example, at an angle.

Figure 6:
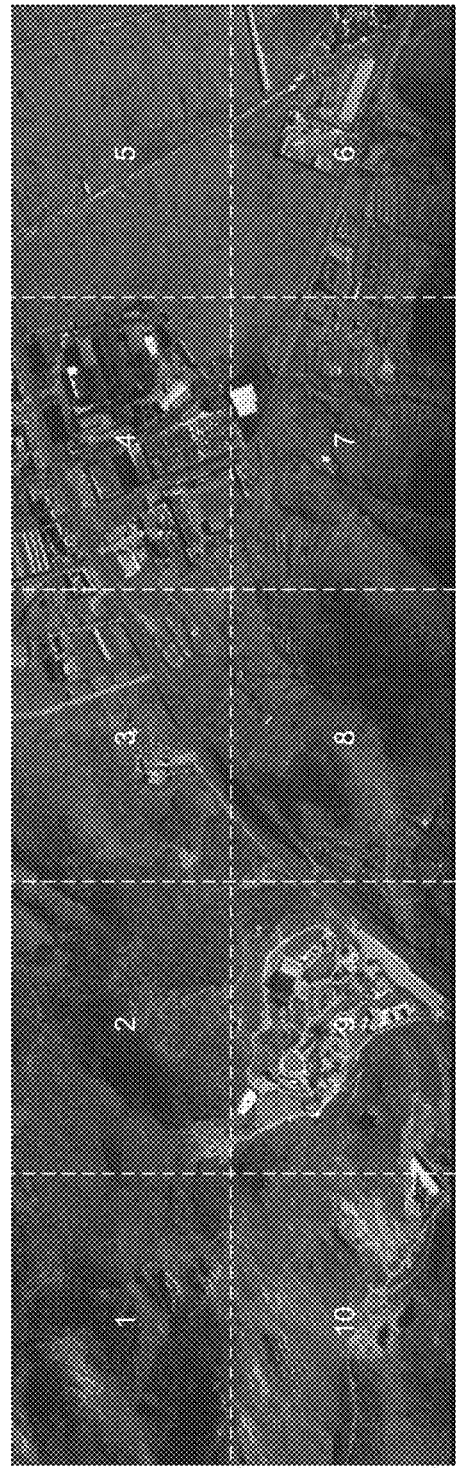
FIG. 6 illustrates another example of a radar image.

FIG. 6 illustrates another example of a radar image 600. The radar image 600 can correspond to the radar image 500 in the example of FIG. 5. However, in the example of FIG. 6, the image processor 302 can divide the radar image into a plurality of sequential units, demonstrated in a 2×5 array. Thus, the radar image 600 includes a quantity of ten sequential units, numbered in order from one to ten. As an example, the image processor 302 can display the delineation between the adjacent sequential units and can display the respective number of each of the sequential units to the user on the display screen 402. As an example, the image processor 302 can divide the radar image 600 into a 2×N array, and thus with no interior portions, to facilitate greater ease for the user to understand a relative location of a given zoomed sequential unit within the overall radar image, as described in greater detail herein.

Figure 7:
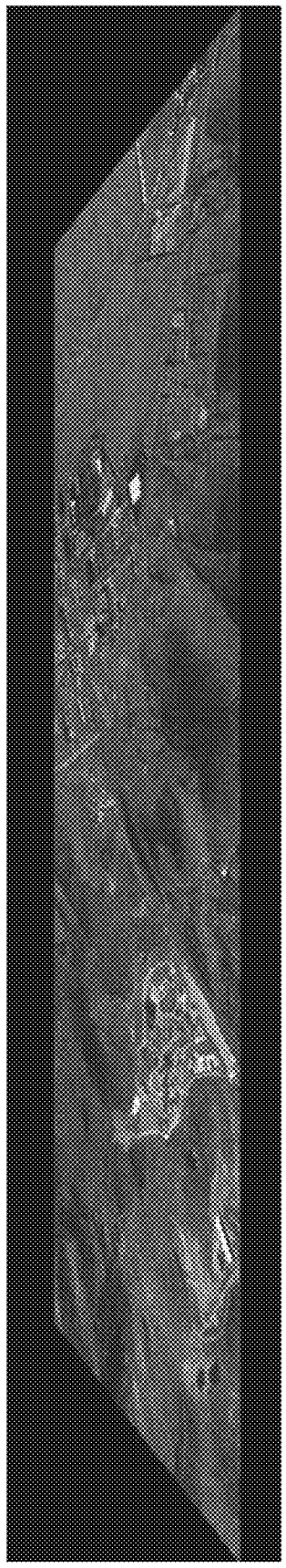
FIG. 7 illustrates another example of a radar image.

FIG. 7 illustrates an example of a radar image 700. The radar image 700 can correspond to an image of the region of interest that has been processed by the image processor 302 and normalized to fit a geometric shape (e.g., rectangular) to be displayed on the display screen 402. In the example of FIG. 7, the region of interest represented by the radar image 700 corresponds to the same region of interest of the radar images 500 and 600 in the respective examples of FIGS. 5 and 6. However, in the example of FIG. 7, the radar image 700 is demonstrated in a perspective view corresponding to an approximate view of the user (e.g., pilot) perspective. Therefore, the image processor 302 can adjust the SAR image data to construct the radar image to appear in the perspective view to the user, which can be at a predetermined or adjustable angle, or can be based on the angle of the aircraft relative to the region of interest.

Figure 8:
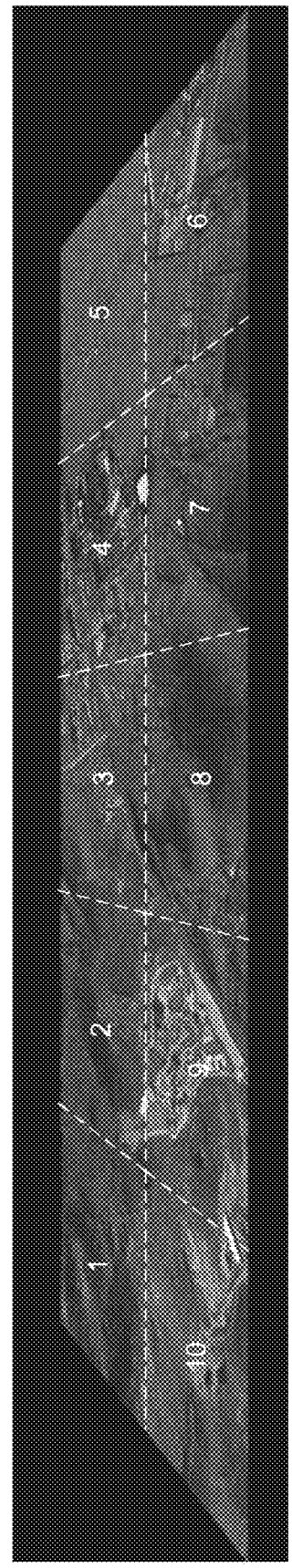
FIG. 8 illustrates another example of a radar image.

FIG. 8 illustrates another example of a radar image 800. The radar image 800 can correspond to the radar image 700 in the example of FIG. 7. However, in the example of FIG. 8, the image processor 302 can divide the radar image into a plurality of sequential units, demonstrated in a 2×5 array. Thus, the radar image 800 includes a quantity of ten sequential units, numbered in order from one to ten. As an example, the image processor 302 can display the delineation between the adjacent sequential units and can display the respective number of each of the sequential units to the user on the display screen 402 in the perspective view. As an example, the image processor 302 can divide the radar image 800 into a 2×N array, and thus with no interior portions, to facilitate greater ease for the user to understand a relative location of a given zoomed sequential unit within the overall radar image, as described in greater detail herein.

Figure 9:
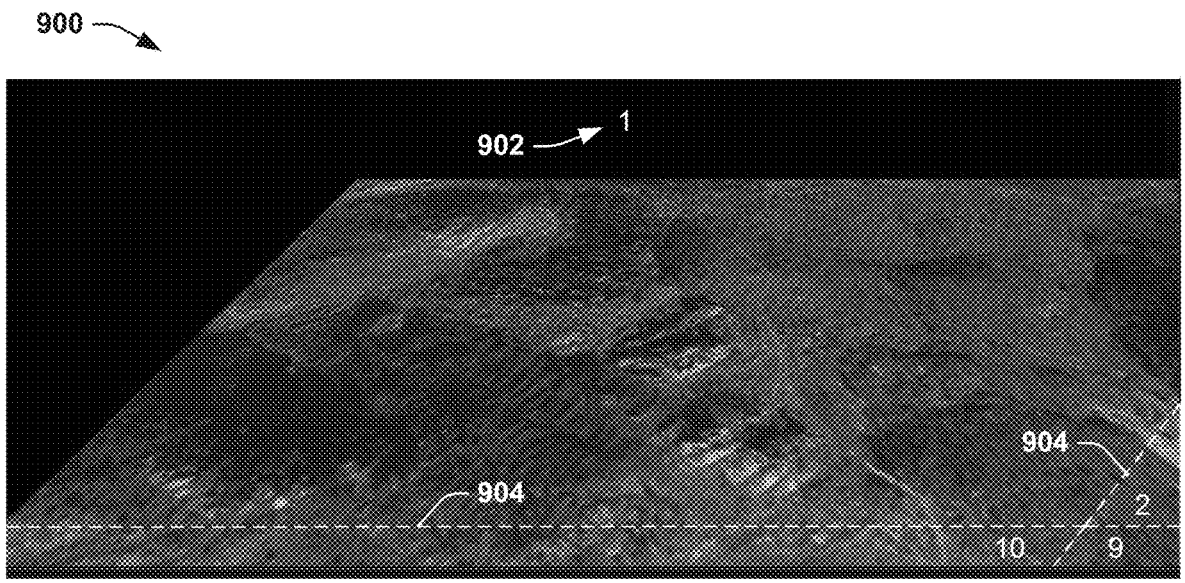
FIG. 9 illustrates another example of a radar image.

FIGS. 9-12 illustrate additional examples of a radar image in the perspective view. Particularly, FIG. 9 illustrates another example of a radar image 900. The radar image 900 can correspond to the first zoomed sequential unit of the radar image 800. The radar image 900 thus includes an identifier (e.g., the number "1") at 902 to indicate to the user which of the zoomed sequential units is being displayed on the display screen 402. As an example, the user can access the radar image 900 corresponding to the first zoomed sequential unit by providing an indexing input to advance from the entire radar image 800. Thus, the image processor 302 can display the first zoomed sequential unit of the radar image 800 in a manner that has a predetermined amount of zoom to display the entirety of the first zoomed sequential unit on the display screen 402.

In the example of FIG. 9, the radar image 900 also includes overlapping portions of adjacent sequential units of the radar image 800. Particularly, the radar image 900 includes a portion of the second sequential unit, the ninth sequential unit, and the tenth sequential unit. In the example of FIG. 9, the overlapping portions of the adjacent sequential units are separated from the first zoomed sequential unit by dashed lines 904 that can be displayed on the display screen 402 (or can be toggled off by the user inputs, for example). The radar image 900 also includes identifiers 906 (e.g., the numbers "2", "9", and "10", respectively) for the overlapping portions of adjacent sequential units of the radar image 800 to identify the respective adjacent sequential units. The identifiers 906 can be located in a manner so as to not be distracting to the user as the user evaluates the first zoomed sequential unit. Additionally, based on the identifier 902, the delineations 904, and the identifiers 906, the user can be able to quickly identify a positional relationship of the displayed zoomed sequential unit (e.g., the first zoomed sequential unit in the example of FIG. 9) relative to the radar image 800 as a whole.

As described above, in response to the user providing an indexing input, the image processor 302 can display the next one of the zoomed sequential units.

Figure 10:
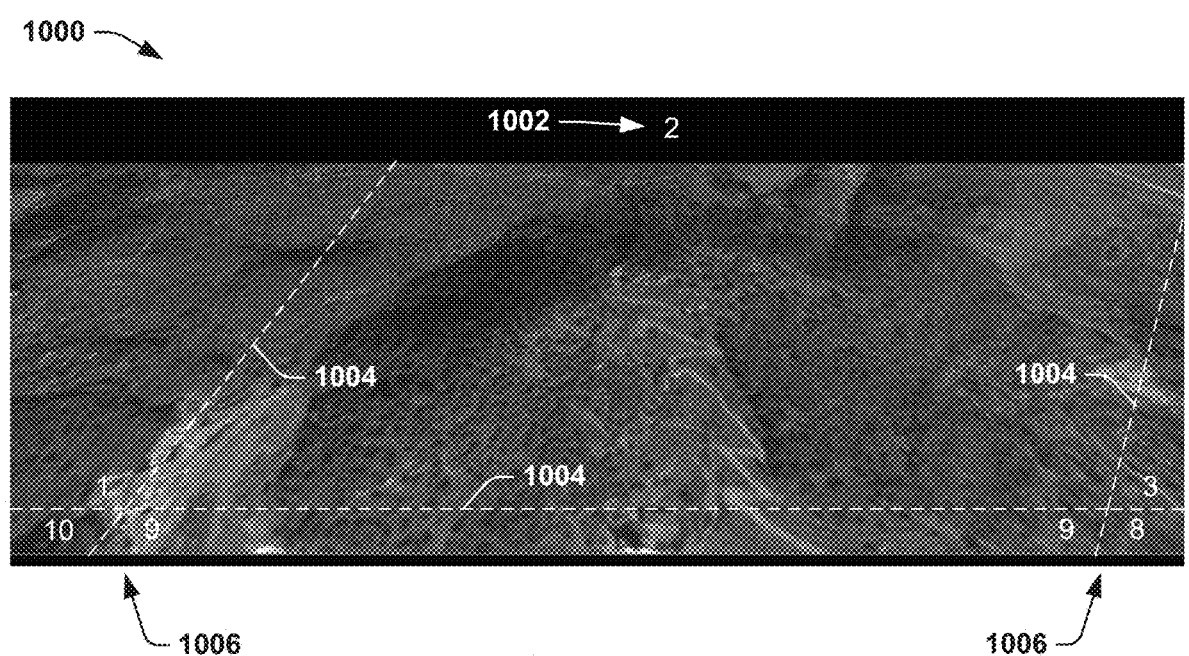
FIG. 10 illustrates another example of a radar image.

FIG. 10 illustrates another example of a radar image 1000. The radar image 1000 can correspond to the second zoomed sequential unit of the radar image 800. The radar image 1000 thus includes an identifier (e.g., the number "2") at 1002 to indicate to the user which of the zoomed sequential units is being displayed on the display screen 402. As an example, the user can access the radar image 1000 corresponding to the second zoomed sequential unit by providing an incrementing indexing input to advance from the first zoomed sequential input, such as the radar image 900, or by providing a decrementing indexing input to go back from the third zoomed sequential input. Thus, the image processor 302 can display the second zoomed sequential unit of the radar image 800 in a manner that has a predetermined amount of zoom to display the entirety of the second zoomed sequential unit on the display screen 402.

In the example of FIG. 10, the radar image 1000 also includes overlapping portions of adjacent sequential units of the radar image 800. Particularly, the radar image 1000 includes a portion of the first sequential unit, the third sequential unit, the eighth sequential unit, the ninth sequential unit, and the tenth sequential unit. In the example of FIG. 10, the overlapping portions of the adjacent sequential units are separated from the second zoomed sequential unit by dashed lines 1004 that can be displayed on the display screen 402 (or can be toggled off by the user inputs, for example). The radar image 1000 also includes identifiers 1006 (e.g., the numbers "1", "3", "8", "9", and "10", respectively) for the overlapping portions of adjacent sequential units of the radar image 800 to identify the respective adjacent sequential units. The identifiers 1006 can be located in a manner so as to not be distracting to the user as the user evaluates the first zoomed sequential unit. Additionally, based on the identifier 1002, the delineations 1004, and the identifiers 1006, the user can be able to quickly identify a positional relationship of the displayed zoomed sequential unit (e.g., the second zoomed sequential unit in the example of FIG. 10) relative to the radar image 800 as a whole.

The transition from the first zoomed sequential unit in the radar image 900 to the second sequential unit in the radar image 1000 in response to the indexing input can be a contiguous visual transition. For example, in response to the indexing input, the image processor 302 can display both the first and second zoomed sequential units as visually sliding across the display screen 402 from the display of the entirety of the first zoomed sequential unit to the second zoomed sequential unit. As another example, in response to the indexing input, the image processor 302 can zoom out from the first zoomed sequential unit (e.g., to the entire radar image 800) followed by zooming in to the second zoomed sequential unit in a visually contiguous manner. In either example, the user can more easily identify and maintain a spatial relationship of the currently viewed zoomed sequential unit relative to the entire radar image 800, and is therefore less likely to get lost as to a location in the entire radar image 800.

As described above, the image processor 302 can provide visual textures on the radar image to better assist the user to find potential tokens of interest based on the SAR image data 304.

Figure 11:
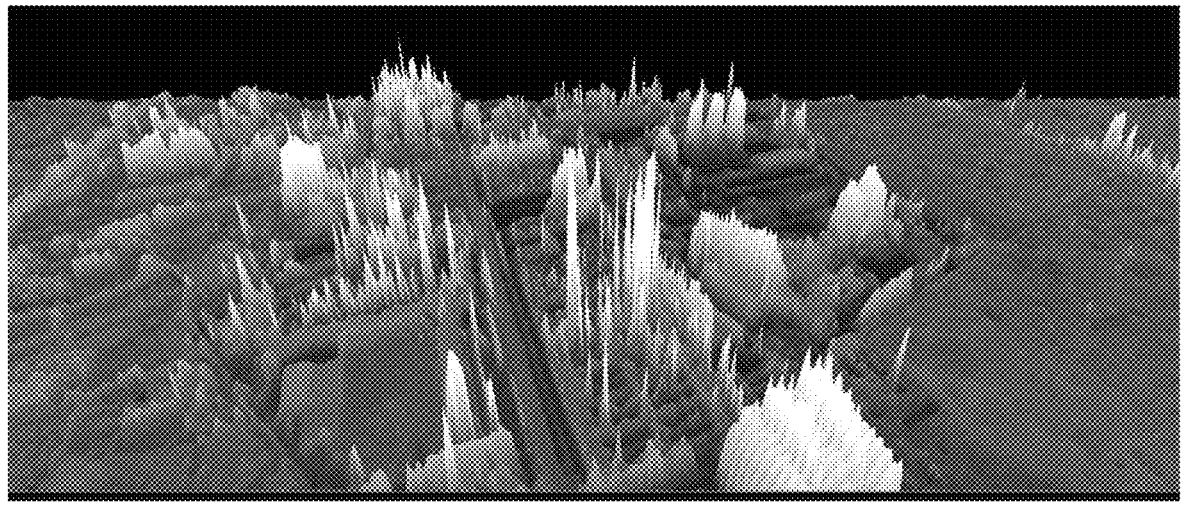
FIG. 11 illustrates another example of a radar image.

FIG. 11 illustrates another example of a radar image 1100. The radar image 1100 can correspond to the fourth zoomed sequential unit of the radar image 800. In the example of FIG. 11, the identifier has been omitted. However, the image processor 302 could display an identifier (e.g., the number "4") to indicate to the user which of the zoomed sequential units is being displayed on the display screen 402. As an example, the user can access the radar image 1100 corresponding to the fourth zoomed sequential unit by providing an incrementing indexing input to advance from the third zoomed sequential input or by providing a decrementing indexing input to go back from the fifth zoomed sequential input. Thus, the image processor 302 can display the fourth zoomed sequential unit of the radar image 800 in a manner that has a predetermined amount of zoom to display the entirety of the fourth zoomed sequential unit on the display screen 402.

In the example of FIG. 11, the radar image 1100 includes a three-dimensional texture provided by the image processor 302 based on reflectivity data associated with the SAR image data 304. The three-dimensional texture of the radar image 306 is represented such that areas of the region of interest that provide higher reflectivity in the SAR image data 304 are represented on the radar image 1100 by proportionally taller spikes. As an example, the user can provide a toggle input to enable the display of the three-dimensional texture on the radar image 1100 via the image processor 302. Therefore, the user can quickly and easily identify portions of the region of interest that result in higher reflectivity of the SAR image data 304. Such higher spikes can therefore more likely correspond to tokens of interest based on the resulting height of the three-dimensional texture of the radar image 306.

Figure 12:
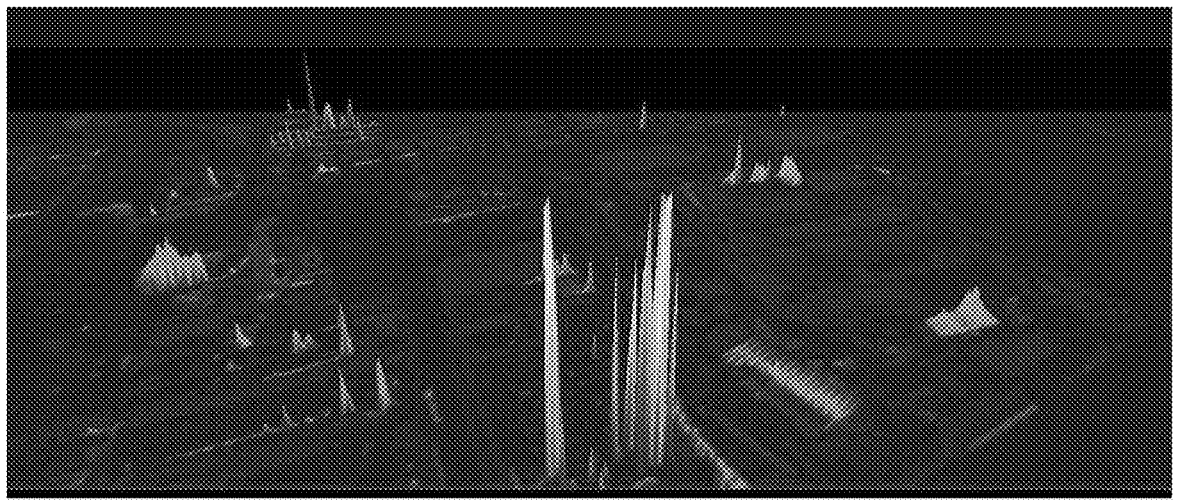
FIG. 12 illustrates another example of a radar image.

FIG. 12 illustrates another example of a radar image 1200. The radar image 1200 can correspond to the fourth zoomed sequential unit of the radar image 800. In the example of FIG. 12, the identifier has been omitted. However, the image processor 302 could display an identifier (e.g., the number "4") to indicate to the user which of the zoomed sequential units is being displayed on the display screen 402. As described above, the user inputs 314 can include a user-selected threshold for the three-dimensional texture of the radar image 306. In the example of FIG. 12, a threshold has been applied via the user inputs 314 in which the three-dimensional texture has been suppressed by a predetermined or programmable amount. Therefore, only portions of the radar image 302 that have a reflectivity above the threshold are demonstrated with three-dimensionality in the example of FIG. 12, with the remaining portions of the radar image 302 that have a reflectivity below the threshold being demonstrated as flat or non-accentuated. As a result, visual noise associated with less reflective portions of the region of interest can be suppressed, leaving only portions of the radar image 1200 having potentially significant reflectivity as being accentuated on the radar image 1200. Therefore, the user can more rapidly identify potential tokens of interest in the radar image 1200 based on the three-dimensional texture displayed as a function of reflectivity.

As also described above, the image processor 302 can also or alternatively apply a colorized texture to the radar image 800. The colorized texture of the radar image 800, and therefore the associated zoomed sequential units, can be represented such that areas of the region of interest that provide higher reflectivity in the SAR image data 304 are represented on the zoomed sequential units by proportional shifts in color (e.g., brighter colors) on the zoomed sequential units. Therefore, the user can quickly and easily identify portions of the region of interest that result in higher reflectivity of the SAR image data 304, which are therefore more likely to correspond to tokens of interest, based on the resulting colors of the colorized texture of the zoomed sequential units.

Figure 13:
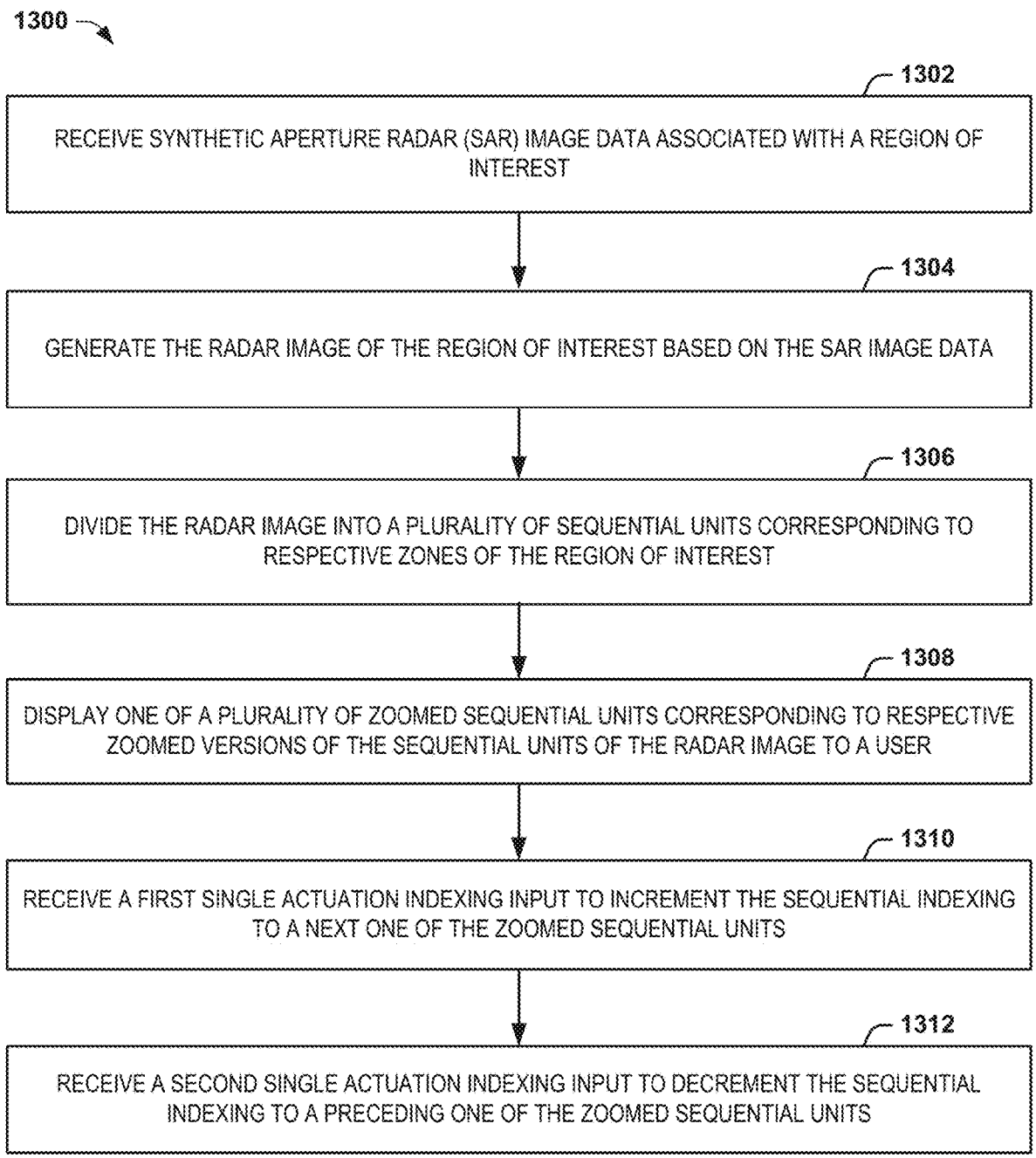
FIG. 13 illustrates an example of a method for providing an interface for user interaction with a radar image.

In view of the foregoing structural and functional features described above, methods in accordance with various aspects of the present disclosure will be better appreciated with reference to FIG. 13. While, for purposes of simplicity of explanation, the method of FIG. 13 is shown and described as executing serially, it is to be understood and appreciated that the present disclosure is not limited by the illustrated orders, as some aspects could, in accordance with the present disclosure, occur in different orders and/or concurrently with other aspects from that shown and described herein. Moreover, not all illustrated features may be required to implement method in accordance with an aspect of the present disclosure.

FIG. 13 illustrates an example of a method 1300 for providing an interface for user interaction with a radar image (e.g., the radar image 306). At 1302, SAR image data (e.g., the SAR image data 304) associated with a region of interest (e.g., the region of interest 204) is received. At 1304, the radar image of the region of interest is generated based on the SAR image data. At 1306, the radar image is divided into a plurality of sequential units corresponding to respective zones of the region of interest. At 1308, one of a plurality of zoomed sequential units corresponding to respective zoomed versions of the sequential units of the radar image is displayed to a user. At 1310, a first single actuation indexing input (e.g., the indexing input 406) is received to increment the sequential indexing to a next one of the zoomed sequential units. At 1312, a second single actuation indexing input (e.g., the indexing input 408) is received to decrement the sequential indexing to a preceding one of the zoomed sequential units.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. A radar image interface system comprising:
   an image processor configured to receive synthetic aperture radar (SAR) image data associated with a region of interest and to generate a radar image of the region of interest based on the SAR image data, wherein the image processor is configured to receive digital terrain and elevation data (DTED) associated with the region of interest, such that the image processor is configured to superimpose the radar image of the region of interest over topographical features of the region of interest defined by the DTED to generate a three-dimensional radar image, the image processor being further configured to divide the three-dimensional radar image into a plurality of sequential units corresponding to respective zones of the region of interest;
   a display system configured to display zoomed sequential units corresponding to respective zoomed versions of the sequential units of the three-dimensional radar image to a user; and
   an input interface configured to facilitate sequentially indexing through each of the zoomed sequential units on the display system in response to an indexing input.

2. The system of claim 1, wherein the indexing input comprises a first single actuation input to increment the sequential indexing to a next one of the zoomed sequential units and a second single actuation input to decrement the sequential indexing to a preceding one of the zoomed sequential units.

3. The system of claim 1, wherein the image processor is configured to generate the radar image in a top-down view and a perspective view, such that the three-dimensional radar image is displayed on the display system in one of the top-down view and the perspective view in response to an input provided to the input interface.

4. The system of claim 1, wherein the image processor is configured to display visual delineation of the sequential units on the three-dimensional radar image.

5. The system of claim 1, wherein the image processor is configured to display a portion of at least one adjacent sequential unit while displaying each of the respective zoomed sequential units.

6. The system of claim 1, wherein the image processor is configured to provide a contiguous visual transition between the sequential units when sequentially indexing through each of the zoomed sequential units on the display system.

7. The system of claim 1, wherein the image processor is configured to generate a three-dimensional texture that is applied to the three-dimensional radar image based on reflectivity of the SAR image data, such that the image processor provides a measure of height of the three-dimensional texture based on a corresponding measure of reflectivity of features within the region of interest.

8. The system of claim 7, wherein the input interface is configured to facilitate a predetermined reflectivity threshold that is set based on an input provided to the input interface, such that the image processor provides variable height of the three-dimensional texture in response to the corresponding variable reflectivity of features within the region of interest having a reflectivity that is greater than the predetermined reflectivity threshold.

9. The system of claim 1, wherein the display system is a color display, wherein the image processor is configured to generate a colorized texture that is applied to the three-dimensional radar image based on reflectivity of the SAR image data, such that the image processor provides color shading of the colorized texture based on a corresponding measure of reflectivity of features within the region of interest.

10. The system of claim 1, wherein the image processor is configured to divide the three-dimensional radar image into a 2×N array of the sequential units, where N is a quantity of sequential units in each of two rows or two columns.

11. An aircraft comprising the radar image interface of claim 1.

12. The aircraft of claim 11, wherein the image processor is configured to receive location data associated with at least one additional aircraft, wherein the image processor is configured to generate the three-dimensional radar image in a first perspective associated with the user and in at least one second perspective associated with the respective at least one additional aircraft, such that the display system is configured to display the three-dimensional radar image in one of the first perspective and the at least one second image in response to an input provided to the input interface.

13. A method for providing an interface for user interaction with a radar image, the method comprising:
receiving synthetic aperture radar (SAR) image data associated with a region of interest;
generating the radar image of the region of interest based on the SAR image data;
receiving digital terrain and elevation data (DTED) associated with the region of interest;
superimposing the radar image of the region of interest over topographical features of the region of interest defined by the DTED to generate a three-dimensional radar image;
dividing the three-dimensional radar image into a plurality of sequential units corresponding to respective zones of the region of interest;
displaying one of a plurality of zoomed sequential units corresponding to respective zoomed versions of the sequential units of the three-dimensional radar image to a user;
receiving a first single actuation indexing input to increment the sequential indexing to a next one of the zoomed sequential units; and
receiving a second single actuation indexing input to decrement the sequential indexing to a preceding one of the zoomed sequential units.

14. The method of claim 13, wherein displaying the zoomed version of one of the sequential units of the three-dimensional radar image to a user comprises displaying a portion of at least one adjacent sequential unit while displaying each of the respective zoomed sequential units.

15. The method of claim 13, further comprising providing a contiguous visual transition between the zoomed sequential units in response to the first and second single actuation indexing inputs.

16. The method of claim 13, further comprising generating a three-dimensional texture that is applied to the three-dimensional radar image based on reflectivity of the SAR image data, such that the image processor provides a measure of height of the three-dimensional texture based on a corresponding measure of reflectivity of features within the region of interest.

17. The method of claim 13, further comprising generating a colorized texture that is applied to the three-dimensional radar image based on reflectivity of the SAR image data, such that the image processor provides color shading of the colorized texture based on a corresponding measure of reflectivity of features within the region of interest.

18. An aircraft comprising a radar image interface system, the radar image interface system comprising:
an image processor configured to receive synthetic aperture radar (SAR) image data associated with a region of interest and to generate a radar image of the region of interest based on the SAR image data, wherein the image processor is configured to receive digital terrain and elevation data (DTED) associated with the region of interest, such that the image processor is configured to superimpose the radar image of the region of interest over topographical features of the region of interest defined by the DTED to generate a three-dimensional radar image that is displayed on the display system, the image processor being further configured to divide the three-dimensional radar image into a plurality of sequential units corresponding to respective zones of the region of interest;
a display system configured to display zoomed sequential units corresponding to respective zoomed versions of the sequential units of the three-dimensional radar image to a pilot; and
an input interface configured to facilitate sequentially indexing through each of the zoomed sequential units on the display system in response to an indexing input.

19. The system of claim 18, wherein the indexing input comprises a first single actuation input to increment the sequential indexing to a next one of the zoomed sequential units and a second single actuation input to decrement the sequential indexing to a preceding one of the zoomed sequential units.

20. The system of claim 18, wherein the image processor is configured to display a portion of at least one adjacent sequential unit while displaying each of the respective zoomed sequential units.

21. The system of claim 18, wherein the image processor is configured to provide a contiguous visual transition between the sequential units when sequentially indexing through each of the zoomed sequential units on the display system.

22. The system of claim 18, wherein the image processor is configured to generate a three-dimensional texture that is applied to the three-dimensional radar image based on reflectivity of the SAR image data, such that the image processor provides a measure of height of the three-dimensional texture based on a corresponding measure of reflectivity of features within the region of interest.

23. The system of claim 22, wherein the input interface is configured to facilitate a predetermined reflectivity threshold that is set based on an input provided to the input interface, such that the image processor provides variable height of the three-dimensional texture in response to the corresponding variable reflectivity of features within the region of interest having a reflectivity that is greater than the predetermined reflectivity threshold.

24. The system of claim 18, wherein the display system is a color display, wherein the image processor is configured to generate a colorized texture that is applied to the three-dimensional radar image based on reflectivity of the SAR image data, such that the image processor provides color shading of the colorized texture based on a corresponding measure of reflectivity of features within the region of interest.

25. The aircraft of claim 18, wherein the image processor is configured to receive location data associated with at least one additional aircraft, wherein the image processor is configured to generate the radar image in a first perspective associated with a user and in at least one second perspective associated with the respective at least one additional aircraft, such that the display system is configured to display the three-dimensional radar image in one of the first perspective and the at least one second image in response to an input provided to the input interface.

* * * * *